(12) United States Patent
Zapata et al.

(10) Patent No.: US 10,031,492 B2
(45) Date of Patent: Jul. 24, 2018

(54) NETWORK IN WIND TURBINE

(75) Inventors: Roberto Zapata, Aarhus N (DK); Tage Kristensen, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1863 days.

(21) Appl. No.: 13/266,088

(22) PCT Filed: Apr. 29, 2010
(Under 37 CFR 1.47)

(86) PCT No.: PCT/EP2010/055800
§ 371 (c)(1),
(2), (4) Date: Apr. 25, 2012

(87) PCT Pub. No.: WO2010/125140
PCT Pub. Date: Nov. 4, 2010

(65) Prior Publication Data
US 2012/0191249 A1    Jul. 26, 2012

Related U.S. Application Data

(60) Provisional application No. 61/174,168, filed on Apr. 30, 2009.

(30) Foreign Application Priority Data

Apr. 30, 2009   (DK) ................ 2009 00556

(51) Int. Cl.
*G05B 15/02* (2006.01)
*F03D 7/04* (2006.01)
(Continued)

(52) U.S. Cl.
CPC ............ *G05B 15/02* (2013.01); *F03D 7/047* (2013.01); *H04L 45/745* (2013.01); *H04L 61/2015* (2013.01); *Y02E 10/723* (2013.01)

(58) Field of Classification Search
CPC .......... F03D 7/027; F03D 7/028; F03D 7/042; F03D 7/047; G05B 15/02; H04L 41/2015; H04L 1/20156
(Continued)

(56) References Cited

U.S. PATENT DOCUMENTS 8,032,614 B2 * 10/2011 Riesberg ............. H04L 61/2015
709/220
8,451,134 B2 * 5/2013 Bharadwaj ............. F03D 7/042
340/648

(Continued)

FOREIGN PATENT DOCUMENTS

EP    1531376 A1    5/2005
EP    2053479 A1    4/2009
(Continued)

OTHER PUBLICATIONS

Lu B, Li Y, Wu X, Yang Z. A review of recent advances in wind turbine condition monitoring and fault diagnosis. InPower Electronics and Machines in Wind Applications, 2009. PEMWA 2009. IEEE Jun. 24, 2009 (pp. 1-7). IEEE.*

(Continued)

*Primary Examiner* — Ranodhi Serrao
*Assistant Examiner* — James Fiorillo
(74) *Attorney, Agent, or Firm* — Patterson + Sheridan, LLP (57) ABSTRACT

The invention relates to a wind turbine (1) comprising a network arranged for communicating with an external network (11), said network of the wind turbine comprising a first sub-network (20) and a second sub-network (30), where the first sub-network (20) is connectable to the external network (11) and where the second sub-network (30) is connectable to and disconnectable from the first network (20). Thus, two or more independent networks are created
(Continued)

within a single wind turbine to allow communication among the different controllers in the wind turbine along with external communication. The second sub-network is disconnectable from the remaining network, while the first sub-network may have permanent remote connection. This network architecture provides for enhanced flexibility, enhanced security and enhanced functionality.

13 Claims, 5 Drawing Sheets

(51) Int. Cl.
*H04L 12/741* (2013.01)
*H04L 29/12* (2006.01)

(58) Field of Classification Search
USPC ......... 709/221, 226, 248, 249, 250; 700/275
See application file for complete search history.

(56) References Cited

U.S. PATENT DOCUMENTS

| | | | | |
|---|---|---|---|---|
| 2004/0010350 | A1* | 1/2004 | Lof | H02J 3/24 700/292 |
| 2005/0012339 | A1* | 1/2005 | Mikhail | F03D 7/0224 290/44 |
| 2005/0090937 | A1* | 4/2005 | Moore | F03D 7/047 700/286 |
| 2007/0118626 | A1* | 5/2007 | Langen | G06F 8/65 709/221 |
| 2007/0216164 | A1* | 9/2007 | Rivas | F03D 7/0224 290/44 |
| 2007/0255832 | A1* | 11/2007 | Riesberg | H04L 61/2015 709/226 |
| 2007/0266423 | A1* | 11/2007 | Tehee, Jr. | F03D 7/028 726/3 |
| 2008/0183900 | A1* | 7/2008 | Staiger | G06F 15/17375 709/249 |
| 2008/0228908 | A1* | 9/2008 | Link | H04L 41/046 709/223 |
| 2009/0070062 | A1* | 3/2009 | Kirrmann | G01R 31/327 702/122 |
| 2009/0187283 | A1* | 7/2009 | Laursen | F03D 7/047 700/287 |
| 2009/0216910 | A1* | 8/2009 | Duchesneau | G06F 9/5072 709/250 |
| 2010/0268849 | A1* | 10/2010 | Bengtson | G05B 15/02 709/248 |
| 2010/0280797 | A1* | 11/2010 | Erichsen | H02G 13/00 702/189 |
| 2011/0020122 | A1* | 1/2011 | Parthasarathy | F03D 17/00 416/61 |
| 2011/0133453 | A1* | 6/2011 | Merswolke | F03D 7/0276 290/44 |
| 2011/0313726 | A1* | 12/2011 | Parthasarathy | G05B 23/024 702/179 |
| 2013/0211611 | A1* | 8/2013 | Ahrensbach | F03D 7/047 700/287 |
| 2015/0018984 | A1* | 1/2015 | Williams | G05B 15/02 700/83 |

FOREIGN PATENT DOCUMENTS

| | | | | |
|---|---|---|---|---|
| WO | 2008025357 A1 | 3/2008 | | |
| WO | 2008025363 A1 | 3/2008 | | |
| WO | WO 2008025357 A1 * | 3/2008 | | F03D 7/028 |
| WO | WO 2008025363 A1 * | 3/2008 | | F03D 7/047 |

OTHER PUBLICATIONS

Zaher AS, McArthur SD, Infield DG, Patel Y. Online wind turbine fault detection through automated SCADA data analysis. Wind Energy. Sep. 1, 2009;12(6):574-93.*
International Search Report for Application No. PCT/EP2010/055800 dated Sep. 22, 2010.
Danish Examination Report for Application No. PA200900556 dated Dec. 2, 2009.

* cited by examiner

NETWORK IN WIND TURBINE

FIELD OF THE INVENTION

The present invention relates to a wind turbine comprising a network arranged for communicating with an external network. The present invention moreover relates to a method of communicating via a network of a wind turbine.

BACKGROUND OF THE INVENTION

The strategically distributed nature of wind power presents unique challenges. A wind turbine may be located onshore or offshore, it may be subject to a variety of meteorological influences and it should be monitored and controlled in order to provide optimal performance.

A wind turbine is usually connected to a system for Supervisory Control And Data Acquisition (SCADA).

A monitoring and control network is described in EP 0 1531 376 disclosing that a further network for transmission of large amounts of data may be added to an existing control and monitoring network in order to avoid that the high bandwidth requirements of the data interferes or blocks the control and monitoring network. A problem related to the disclosed network is that addition of further high bandwidth requiring applications, such as data monitoring and data analysis either requires an even further network or—even worse—restricts the access time related to critical operations of the network. Even though introducing a further network, the monitoring and control data is still transmitted through the same network.

During service of a wind turbine, the wind turbine is shut down and typically disconnected from the SCADA system for safety reasons, so that service technicians entering the wind turbine can be sure that the wind turbine cannot be operated from outside. However, this disconnection from the SCADA system renders it difficult for the service technicians to obtain information on past performance of the wind turbine.

Hence, an improved wind turbine would be advantageous, and in particular a wind turbine with a more efficient and/or reliable system for obtaining wind turbine information during service would be advantageous.

SUMMARY OF THE INVENTION

It may be seen as an object of the present invention to provide a wind turbine that solves the above mentioned problems of the prior art with regards to obtaining relevant wind turbine information during service. Moreover, it may be seen as a further object of the present invention to provide a more flexible and/or secure wind turbine.

This object and several other objects are obtained in a first aspect of the invention by providing a wind turbine comprising a network arranged for communicating with an external network, said network of the wind turbine comprising a first sub-network and a second sub-network, where the first sub-network is connectable to the external network and where the second sub-network is connectable to and disconnectable from the first network and/or connectable to and disconnectable from the external network (11).

The invention is particularly, but not exclusively, advantageous for obtaining a network architecture providing secure and flexible communication within a wind turbine and between the wind turbine and an external network. The first sub-network may remain connected to the external network, whilst the second sub-network may be connected to or disconnected the external network, irrespective of whether the second sub-network is connectable to and disconnectable from the first sub-network and/or directly connectable to and disconnectable from the external network. When the second sub-network is disconnected from the external network, as a disconnection from the first sub-network and/or as a disconnection directly from the external network, the second sub-network functions as a local network and no commands from outside the second sub-network may influence any components connected to the second sub-network. Moreover, the components of the first and second networks are distinct, in the sense that no element is included in both sub-networks.

In an embodiment of the wind turbine according to the invention, a disconnector is arranged between the first and the second sub-networks. The disconnector ensures that the second sub-network may be disconnected from and connected to the first sub-network. When the second sub-network is disconnected from the first sub-network and it is also disconnected from any external network.

Additionally or alternatively, a disconnector is arranged between the second sub-network and the external network, so that the second sub-network is connectable to and disconnectable from the external network. In the case where the second sub-network is connected to both the first sub-network and the external network, a first disconnector is preferably arranged between the first and the second sub-network and a second disconnector is arranged between the second sub-network and the external network. Thus, the second sub-network may reliably be disconnected from any external network.

In another embodiment of the wind turbine of the invention, a router is arranged between the first sub-network and the external network and/or between the second sub-network and the external network. Hereby the security of the wind turbine network is enhanced.

In yet another embodiment of the wind turbine of the invention, the second sub-network comprises controllers of the wind turbine. Preferably, all relevant controllers for controlling the wind turbine operation are comprised in the second sub-network. When the second sub-network is disconnected from the first sub-network and thus from any external network, the wind turbine cannot be controlled from outside.

In a further embodiment of the wind turbine of the invention, the network of the wind turbine is arranged for communicating with a SCADA system via the first sub-network network. The SCADA system may comprise one or more remote SCADA servers, in which case the communication with the SCADA system may take place via the external network to which the first sub-network is connected. Hereby, when the second sub-network is disconnected from the first sub-network, such as during service, a service technician may connect a service computer to the first sub-system of the wind turbine in order to communicate with external servers, e.g. a SCADA server, in order to obtain information on past condition monitoring, information from SCADA system, documentation, service information such as service tables, as well as communicating with any other accessible server.

In yet another embodiment of the wind turbine of the invention, the first sub-network comprises a tower part comprised in the tower of the wind turbine and a nacelle part comprised in or at the nacelle of the wind turbine. The first sub-network may moreover comprise one or more of the following: a ground part located at the bottom of the wind turbine, a hub part located at a hub of the turbine, an outside part of the network located outside the wind turbine.

Moreover, the second sub-network comprises a tower part comprised in the tower of the wind turbine and a nacelle part comprised in or at the nacelle of the wind turbine. The second sub-network may furthermore comprises one or more of the following: a ground part located at the bottom of the wind turbine, a hub part located at a hub of the turbine, an outside part of the network located outside the wind turbine.

This sub-division of the first and second sub-networks into different parts located in different places of the wind turbine is advantageous during service, in that servicing may be performed within the tower, the nacelle, the hub, on the ground as well as outside the wind turbine, such as at a transformer station or switch gear. The different parts of the first and/or second sub-network(s) may be connected via optical cable and the first and/or second sub-network(s) comprise(s) necessary converters for changing from copper to optical cable and vice versa.

It should be noted that the term "a sub-network comprise a specific part" is meant to denote that the specific part is connected to or connectable to other elements of the sub-network.

According to a second aspect, the invention relates to a method of communicating via a network of a wind turbine, the method comprising the steps of disconnecting the second sub-network from the first sub-network and any external network, and communicating with the external network via the first sub-network.

In an embodiment of the method of the invention, the communicating with the external network comprises connecting a service computer to an external network via the first sub-network in order to obtain information during servicing. Moreover, a service computer may be connected to the disconnected second sub-network for performing service actions.

According to a third aspect, the invention moreover relates to use of a wind turbine network a comprising a first sub-network and a second sub-network, where the first sub-network is connectable to an external network and where the second sub-network is connectable to and disconnectable from the first network during service of the wind turbine.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF AN EMBODIMENT

Figure 1:
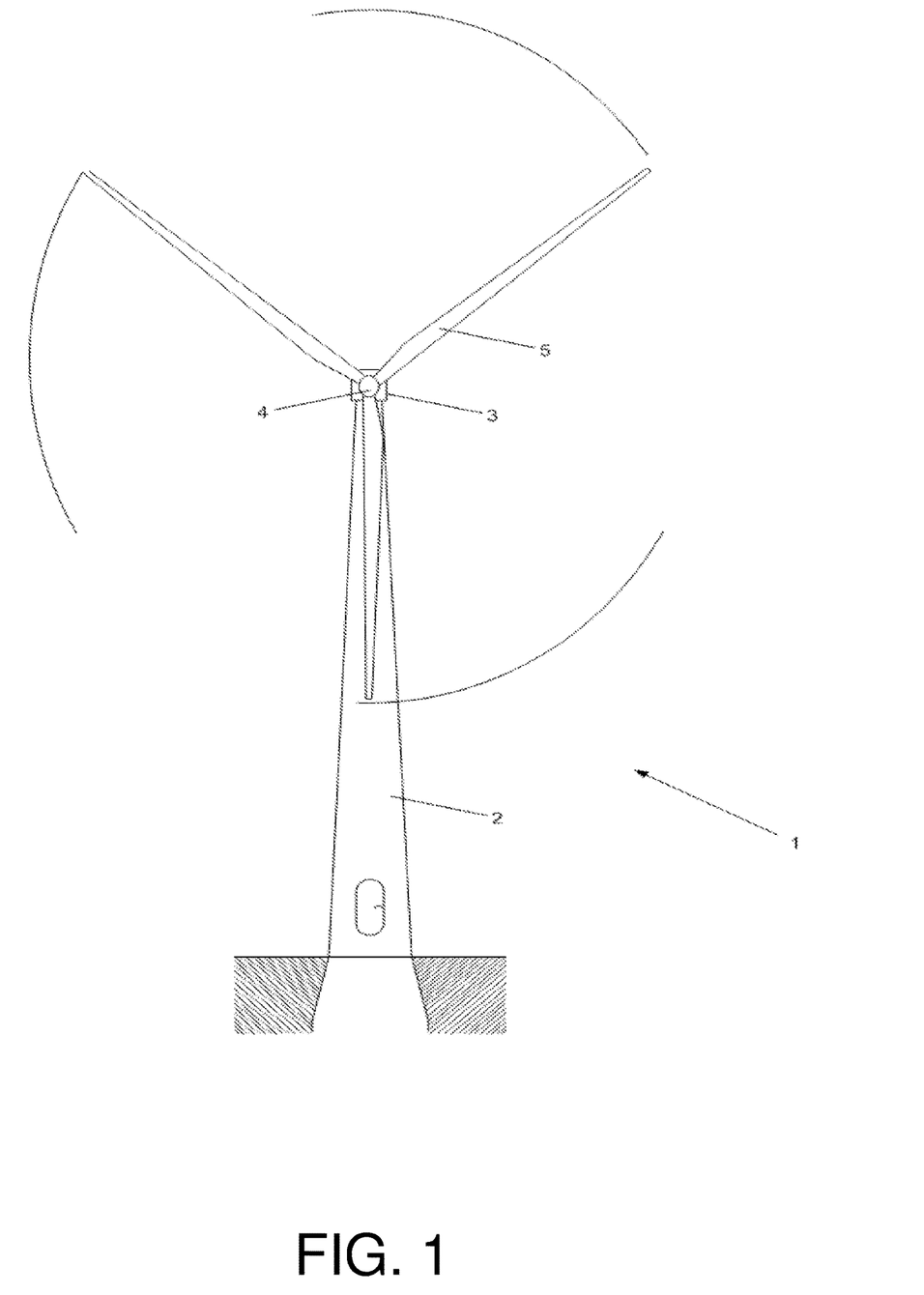
FIG. 1 illustrates a wind turbine as seen from the front.

FIG. 1 illustrates a wind turbine 1. The wind turbine 1 comprises a tower 2 positioned on a foundation. A wind turbine nacelle 3 with a yaw mechanism is placed on top of the tower 2. A low speed shaft extends out of the nacelle front and is connected with a wind turbine rotor through a wind turbine hub 4. The wind turbine rotor comprises at least one rotor blade e.g. three rotor blades 5 as illustrated.

Figure 2A:
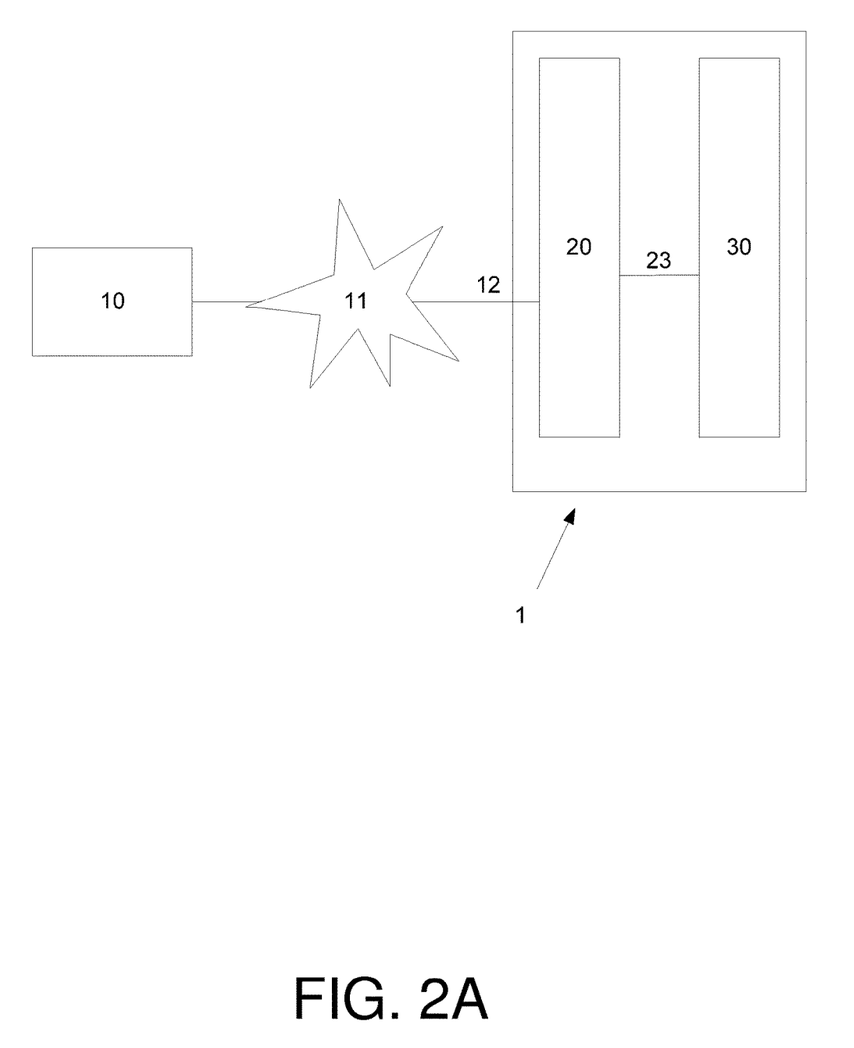
FIGS. 2a and 2b are is schematic views of a wind turbine connected to an external server.

FIG. 2a is a schematic view of a wind turbine 1 connected to an external server 10 via a communication network 11. In FIG. 2a, the wind turbine 1 is illustrated as a box with the reference number 1; thus, the individual components, such as the nacelle, the blades and/or the tower, are not discernible from the figure. The windturbine comprises a first sub-network 20 and a second sub-network 30. The first sub-network 20 is connectable to an external communication network 11 via a communication line 12, whereby the first sub-network 20 is connectable to an external server 10 via the external communication network 11. The second sub-network 30 is connectable to the first sub-network 10 via the communication line 23. The second sub-network 30 may be disconnected from the first sub-network 20. In this case the second sub-network is also disconnected from the external network 11, and functions as a local network 30 within the wind turbine 1. The communication lines 12 and 23 may be any relevant communication lines, wired, optical or wireless, such ethernet, cellular radio network, such as GSM, satellite phone networks, or any other appropriate communication line.

Figure 2B:
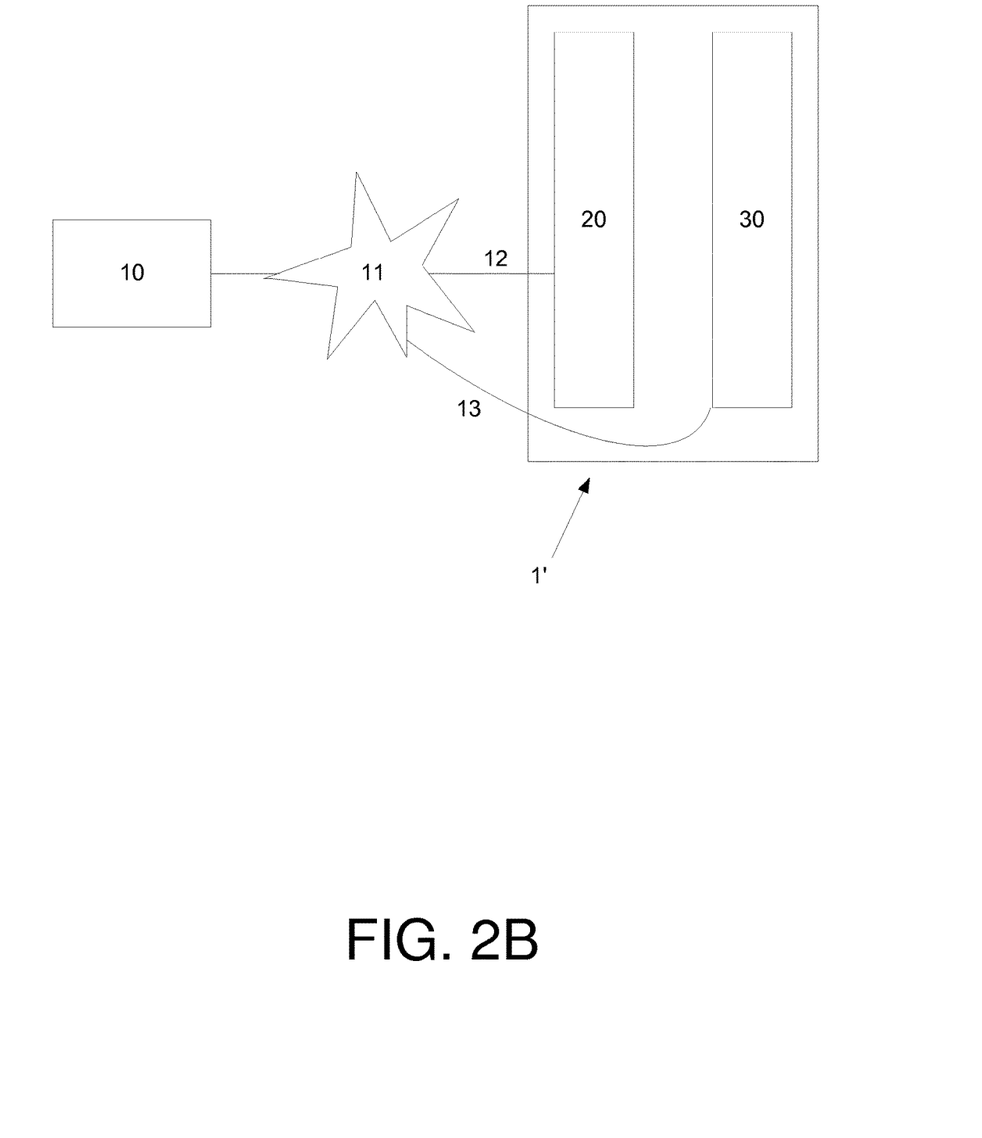

FIG. 2b is a schematic view of an alternative wind turbine 1' connected to an external server 10 via a communication network 11. In FIG. 2b, the wind turbine 1' is illustrated as a box; thus, the individual components, such as the nacelle, the blades and/or the tower, are not discernible from the figure. The windturbine comprises a first sub-network 20 and a second sub-network 30. The first sub-network 20 is connectable to an external communication network 11 via a communication line 12, whereby the first sub-network 20 is connectable to an external server 10 via the external communication network 11. The second sub-network 30 is connectable directly to the external communication network 11 via the communication line 13. The second sub-network 30 may be disconnected from the external communication network. In this case the second sub-network 30 functions as a local network 30 within the wind turbine 1'. The communication lines 12 and 13 may be any relevant communication lines, wired, optical or wireless, such ethernet, cellular radio network, such as GSM, satellite phone networks, or any other appropriate communication line. Moreover, a communication line between the first and second sub-networks 20, 30 may additionally exist (not shown in FIG. 2B), so that the second sub-network 30 is connectable to the external network 11 and thus to the server 10 through either the communication line 13 or via the first sub-network through communication lines 12 and 23. In this case, the second sub-network 30 may be disconnected from the external network 11 by both disconnecting any connection between the external network 11 and the second sub-network 30 via the communication line 13 as well as any the connection between the first sub-network 20 and the second sub-network 30 via the communication line 23.

It should be noted that the first and second sub-network 20, 30 may be connected to different external networks and/or to different servers.

Figure 3:
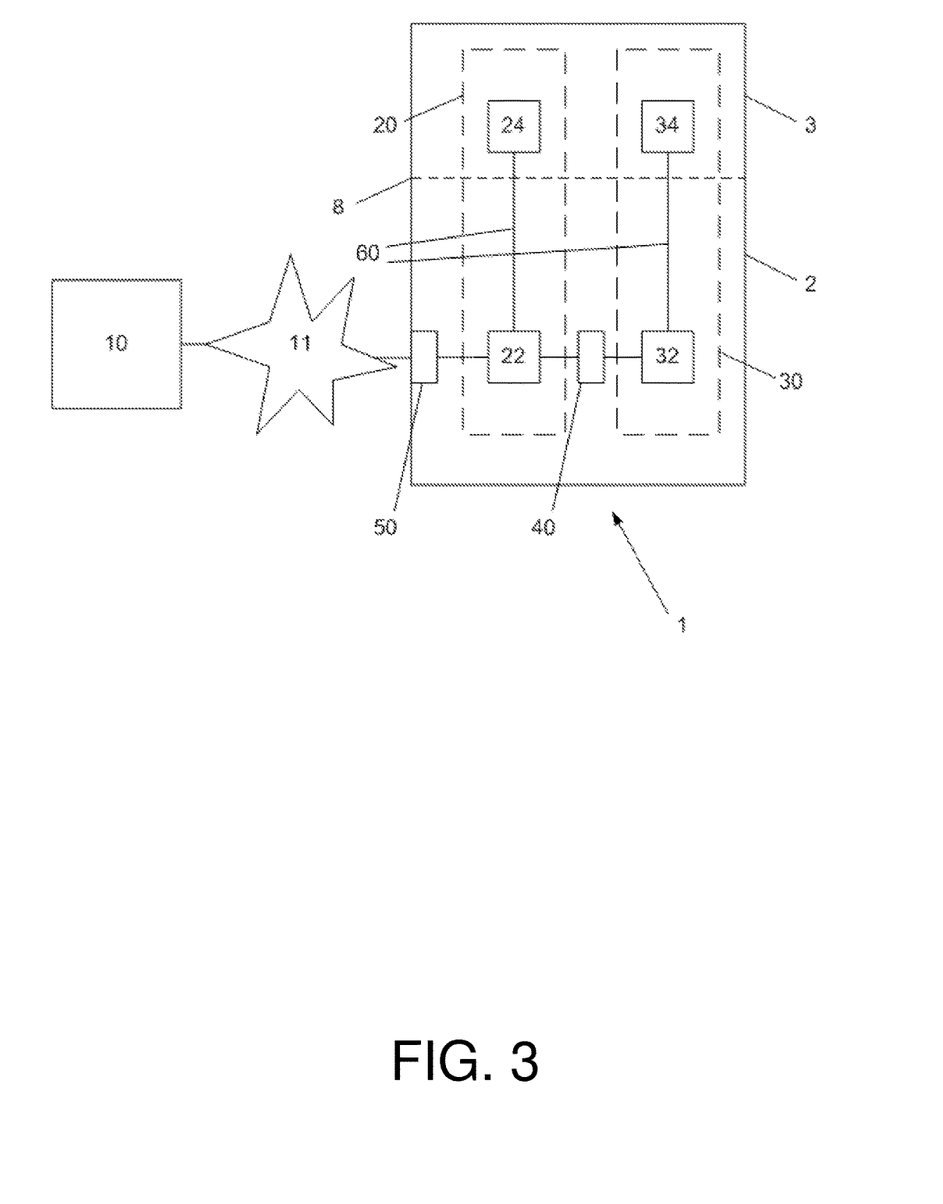
FIG. 3 is another schematic view of a wind turbine connected to an external server.

FIG. 3 is a schematic view of a wind turbine 1 connected to an external server 10 via a communication network 11. In FIG. 3, the wind turbine 1 is illustrated as a box with the reference number 1; thus, the individual components, such as the nacelle, the blades and/or the tower, are not discernible from the figure. However, the vertical broken line 8 are meant to delimit the tower of the wind turbine from the nacelle; thus elements shown above the line 8 in FIG. 3 are placed at or in the nacelle, whilst elements shown below the line 8 are placed in or at the tower of the wind turbine.

The first sub-network 20 and the second sub-network 30 of the wind turbine 1 is shown. Again, the first sub-network 20 is connectable to an external server 10 via an external network 11 and the second sub-network 30 may be connected to or disconnected from the first sub-network 20. When the second sub-network 30 is connected to the first sub-network 20, is also connected to the external network 11. In the case where the second sub-network 30 is disconnected from the first sub-network 20, the second sub-network 30 is also disconnected from the external network 11, and functions as a local network 30 within the wind turbine 1. Between the first sub-network 20 and the second sub-network 30 is a disconnector 40 provided in order to ensure that the second sub-network may be disconnected from and connected to the first sub-network. When the second sub-network is disconnected from the first sub-network and it is also disconnected from any external network. The disconnector 40 could also be placed above the line 8, e.g. at or in the nacelle or the hub.

A router 50 is placed between the first sub-network 20 and the external network 11 in order to enhance the security by limiting the remote access to the network of the wind turbine. Alternatively, the router 50 might be placed between the first sub-network 20 and the second sub-network 30.

The first sub-network 20 may be denoted a communication network. Preferably, all controls of the wind turbine are placed in second sub-network 30, which may also be denoted a control network. The second sub-network 30 may, when disconnected from the first sub-network 20 be used as an internal or a local network for trouble-shooting and/or servicing the wind turbine 1. When the second sub-network 30 is disconnected from the first sub-network 20, e.g. during service, no communication is possible between the second sub-network 30 and an external network 11; however, the first sub-network may stay connected to the external network 11, whereby a service technician or other person may connect a computer, such as a service computer, to the first sub-system of the wind turbine in order to communicate with external servers, e.g. a SCADA server, in order to obtain information on past condition monitoring, information from SCADA system, documentation, service information such as service tables, as well as communicating with any other accessible server in order to obtain or send other information, for example in the process of getting help from colleagues from a remote location.

The first sub-network 20 comprises a tower part 22 and a nacelle part 24, and the second sub-network comprises a tower part 32 and a nacelle part 34. This is advantageous during service, in that servicing may be performed within the tower as well as within the nacelle. The tower part 22 and the nacelle part 24 of the first sub-network 20 as well as the tower part 32 and the nacelle part 34 of the second sub-network 30 are connected via optical cable 60. Moreover, the first and second sub-networks comprise the appropriate converters (not shown in FIG. 3) for changing from copper to optical cable and vice versa.

The advantages of the network architecture shown in FIG. 3 are inter alia:

Functional advantage, in that the network architecture of FIG. 3 enhances the security, e.g. firewall protection, permanent remote connection of the first sub-network 20, whilst the second sub-network 30 may be a disconnectable control network useful for troubleshooting and servicing the wind turbine;

Economic advantages, in that the network architecture may be used in a variety of wind turbine models, independently of the distance to any substation and the number of wind turbines in a wind farm or wind power plant;

Enhanced security during service, in that the second sub-network 30 may be a control network comprising all relevant controls for controlling the operation of the wind turbine, whilst the first sub-network may provide remote access to external servers for provision of information during service;

Enhanced security in general due to the presence of a router.

The embodiment shown in FIG. 2B may also be divided into different parts, such as the tower part 22, 32 and nacelle parts 24, 34 described in relation to FIG. 3. Furthermore, both embodiments may comprise one or more of the following additional parts: a ground part located at the bottom of the wind turbine, a hub part located at a hub of the turbine, an outside part of the network located outside the wind turbine 1, as well as appropriate communication lines between the parts of the sub-networks. Moreover, the embodiment shown in FIG. 2B may also comprise a router and/or disconnector.

Figure 4:
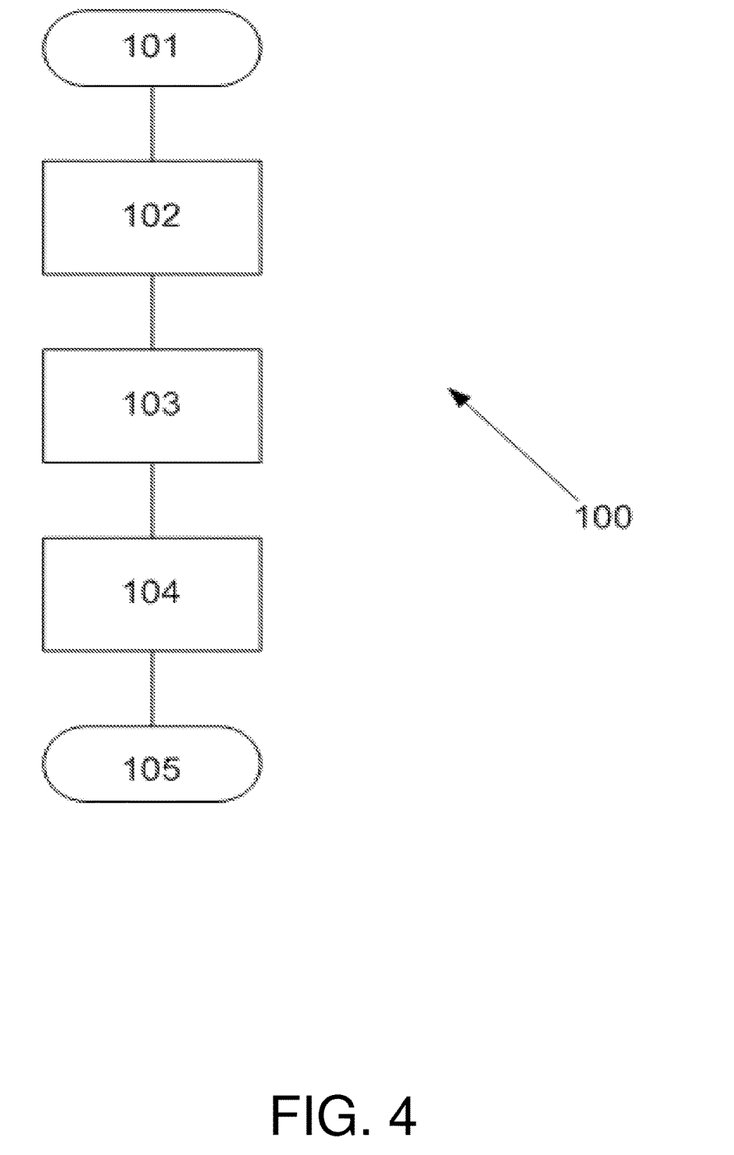
FIG. 4 is a flow-chart of a method according to the invention.

FIG. 4 is a flow-chart of a method 100 of communicating via a network of a wind turbine according to the invention. In the below, reference is also made to the elements of FIGS. 1-3. The method starts in 101 and continues to step 102, wherein connection of the first sub-network 20 to an external network 11 is provided. Such provision may be the mere action of checking or securing that the first sub-network 20 is connected to an external network.

In the subsequent step 103, disconnection of the second sub-network 30 from the first sub-network 20 and any external network is provided for. Such provision may be the action of checking that the second sub-network 30 is disconnected from the first sub-network 20 or it may be the actual action of disconnecting the second sub-network 30 from the first sub-network 20.

In the subsequent step 104, information is communicated between the external network and the first sub-network 20. The provision of communication between the external network and the first sub-network may comprise connecting a service computer to an external network via the first sub-network in order to obtain information during servicing.

The method may also comprise the step of connecting a service computer to the disconnected second sub-network 30 for performing service actions. Such service actions may be carried out whilst the first sub-network is connected to the external network for exchange of necessary, valuable or useful information during service.

The method ends in step 105.

In the above, the term "network of wind turbine" is meant to denote a network within a single wind turbine as opposed to a network connecting a plurality of wind turbine. The first and second sub-networks of a wind turbine are part of a network of a wind turbine; such first and second sub-network are thus not distributed between wind turbines.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be

The invention claimed is:

1. A wind turbine comprising a network arranged for communicating with an external network said network of the wind turbine comprising:
   a first sub-network comprising one or more network devices located in a tower portion of the wind turbine and one or more network devices located in a nacelle portion of the wind turbine, the first sub-network communicatively coupled to the external network and arranged to communicate with one or more remote servers of the external network;
   a second sub-network comprising one or more network devices located in the tower portion of the wind turbine, one or more network devices located in the nacelle portion of the wind turbine, and one or more controllers configured to control operations of the wind turbine;
   wherein the second sub-network is selectively communicatively coupled to the first sub-network and to the external network, wherein the second sub-network is capable of being disconnected from the first sub-network and is capable of being disconnected from the external network;
   wherein the second sub-network is operable to control the wind turbine when the second sub-network is disconnected from the first sub-network and wherein the external network cannot access the controllers of the wind turbine when the second sub-network is disconnected from the first sub-network; and
   wherein the first sub-network is operable to be communicatively coupled with a service computer and is operable to provide information to the service computer related to servicing the wind turbine when the second sub-network is disconnected from the first sub-network.

2. The wind turbine according to claim 1, wherein a disconnector is arranged between the first and the second sub-networks.

3. The wind turbine according to claim 1, wherein a disconnector is arranged between the second sub-network and the external network.

4. The wind turbine according to claim 1, wherein said first sub-network of the wind turbine is arranged for communicating with a SCADA system.

5. The wind turbine according to claim 1, wherein the first sub-network further comprises one or more of the following: a ground part located at a bottom of the wind turbine, a hub part located at a hub of the turbine, and an outside part of the network located outside the wind turbine.

6. The wind turbine according to claim 1, wherein the second sub-network further comprises one or more of the following: a ground part located at a bottom of the wind turbine, a hub part located at a hub of the turbine, and an outside part of the network located outside the wind turbine.

7. A method of communicating via a network of a wind turbine, the method comprising:
   providing a control network and a communication network disposed in the wind turbine, the control network and the communication network each comprising one or more network devices located in a tower portion of the wind turbine and one or more network devices located in a nacelle portion of the wind turbine, wherein the control network further comprises one or more controllers configured to control operations of the wind turbine, wherein the control network is selectively connected to a network external to the wind turbine, wherein the communication network is connected to the external network and arranged to communicate with one or more remote servers of the external network, and wherein the control network is selectively coupled to the communication network;
   disconnecting the control network from the external network such that a component in the wind turbine connected to the control network cannot be controlled via the external network;
   maintaining a connection between the external network and the communication network, wherein the communication network is unable to communicate with the component of the wind turbine; and
   after disconnecting the control network from the external network:
   accessing the one or more remote servers communicatively coupled to the external network via the communication network to obtain information pursuant to servicing of a component of the wind turbine wherein the communication network further comprises a service computer; and
   accessing the component of the wind turbine using the one or more controllers in the control network.

8. The method of claim 7, wherein the one or more remote servers are a portion of a Supervisory Control And Data Acquisition (SCADA) system.

9. The method of claim 8, wherein disconnecting the control network from the external network prevents the SCADA system from controlling the component in the wind turbine.

10. The method of claim 7, wherein the control network is connected indirectly to the external network via the communication network, wherein disconnecting the control network from the external network comprises disconnecting the control network from the communication network.

11. The method of claim 7, wherein accessing the one or more remote servers via the communication network further comprises accessing stored data on the one or more remote servers associated with the component of the wind turbine.

12. A method of communicating via a network of a wind turbine, comprising:
   providing for connection of a first sub-network of the wind turbine network from an external network comprising one or more remote servers, the first sub-network comprising one or more network devices located in a tower portion of the wind turbine and one or more network devices located in a nacelle portion of the wind turbine;
   providing for disconnection of a second sub-network of the wind turbine network from the first sub-network and the external network, the second sub-network comprising one or more network devices located in the tower portion of the wind turbine, one or more network devices located in the nacelle portion of the wind turbine, and one or more controllers configured to control operations of the wind turbine;
   providing for communication between the external network and the first sub-network while the second sub-network is disconnected from the first sub-network;

wherein the second sub-network is operable to control the wind turbine when the second sub-network is disconnected from the first sub-network, and wherein the external network cannot access the controllers of the wind turbine when the second sub-network is disconnected from the first sub-network; and providing for a connection of the first sub-network to a service computer to provide information to the service computer related to servicing the wind turbine, when the second sub-network is disconnected from the first sub-network.

13. The method of communicating according to claim 12, wherein the method further comprises:

connecting the service computer to the disconnected second sub-network for performing service actions.

* * * * *